United States Patent
Boutnaru

(10) Patent No.: US 11,055,168 B2
(45) Date of Patent: Jul. 6, 2021

(54) UNEXPECTED EVENT DETECTION DURING EXECUTION OF AN APPLICATION

(71) Applicant: PayPal, Inc., San Jose, CA (US)

(72) Inventor: Shlomi Boutnaru, Modi'in-Maccabim-Re'ut (IL)

(73) Assignee: PayPal, Inc., San Jose, CA (US)

( * ) Notice: Subject to any disclaimer, the term of this patent is extended or adjusted under 35 U.S.C. 154(b) by 129 days.

(21) Appl. No.: 16/267,701

(22) Filed: Feb. 5, 2019

(65) Prior Publication Data

US 2019/0370106 A1 Dec. 5, 2019

Related U.S. Application Data

(63) Continuation of application No. 15/343,805, filed on Nov. 4, 2016, now Pat. No. 10,198,309.

(51) Int. Cl.
| | | |
|---|---|---|
| *G06F 11/00* | (2006.01) | |
| *G06F 11/07* | (2006.01) | |
| *G06F 11/30* | (2006.01) | |
| *G06F 11/34* | (2006.01) | |

(52) U.S. Cl.
CPC ...... *G06F 11/0793* (2013.01); *G06F 11/0706* (2013.01); *G06F 11/079* (2013.01); *G06F 11/0751* (2013.01); *G06F 11/0775* (2013.01); *G06F 11/302* (2013.01); *G06F 11/3495* (2013.01)

(58) Field of Classification Search
CPC ............... G06F 11/0751; G06F 11/079; G06F 11/0793; G06F 11/302
See application file for complete search history.

(56) References Cited

U.S. PATENT DOCUMENTS

| | | | |
|---|---|---|---|
| 9,998,483 B2 | 6/2018 | Sukhomlinov | |
| 10,198,309 B2 | 2/2019 | Boutnaru | |
| 2009/0187791 A1* | 7/2009 | Dowling | G06F 11/3636 714/38.14 |
| 2015/0095892 A1* | 4/2015 | Baggott | G06F 11/34 717/127 |
| 2016/0098341 A1 | 4/2016 | Pho | |
| 2017/0180399 A1 | 6/2017 | Sukhomlinov | |
| 2018/0129552 A1 | 5/2018 | Boutnaru | |

OTHER PUBLICATIONS

Entire Prosecution History of U.S. Appl. No. 15/343,805, titled Unexpected Event Detection During Execution of an Application, filed Nov. 4, 2016.

* cited by examiner

*Primary Examiner* — Charles Ehne

(57) ABSTRACT

A computer-implemented method is provided. The method may include generating a state model for an application including a plurality of modeled stack traces generated via execution of a plurality of characterization scenarios of the application. The method may also include comparing each static data point in at least one stack trace generated during execution of the application to one or more modeled stack traces of the plurality of modeled stack traces of the state model. In addition, the method may include detecting, based on the comparison, at least one inconsistent event in the at least one stack trace generated during executing of the application. The method may further include performing at least one remedial action in response to detection of the at least one inconsistent event.

20 Claims, 6 Drawing Sheets

UNEXPECTED EVENT DETECTION DURING EXECUTION OF AN APPLICATION

CROSS-REFERENCE TO RELATED APPLICATIONS

This application is a continuation of U.S. patent application Ser. No. 15/343,805, filed on Nov. 4, 2016, now U.S. Pat. No. 10,198,309, issued on Feb. 5, 2019; the disclosure of which is incorporated by reference herein.

TECHNICAL FIELD

The present disclosure relates generally to detecting unexpected events during execution of an application.

BACKGROUND

Malware, which may also be referred to as "malicious software," may come in the form of code, executables, scripts, active content, or other software forms, as well as input/output streams (e.g., packets). Malware may include viruses, exploits, Trojan horses, worms, rootkits, spyware and the like, and may cause an attack on a device, which may, for example, shut down the device, delete a file on the device, and/or acquire information from the device.

This background is only provided to illustrate one example technology area where some embodiments described herein may be practiced.

BRIEF DESCRIPTION OF THE DRAWINGS

Example embodiments will be described and explained with additional specificity and detail through the use of the accompanying drawings in which.

DETAILED DESCRIPTION

Figure 1A:
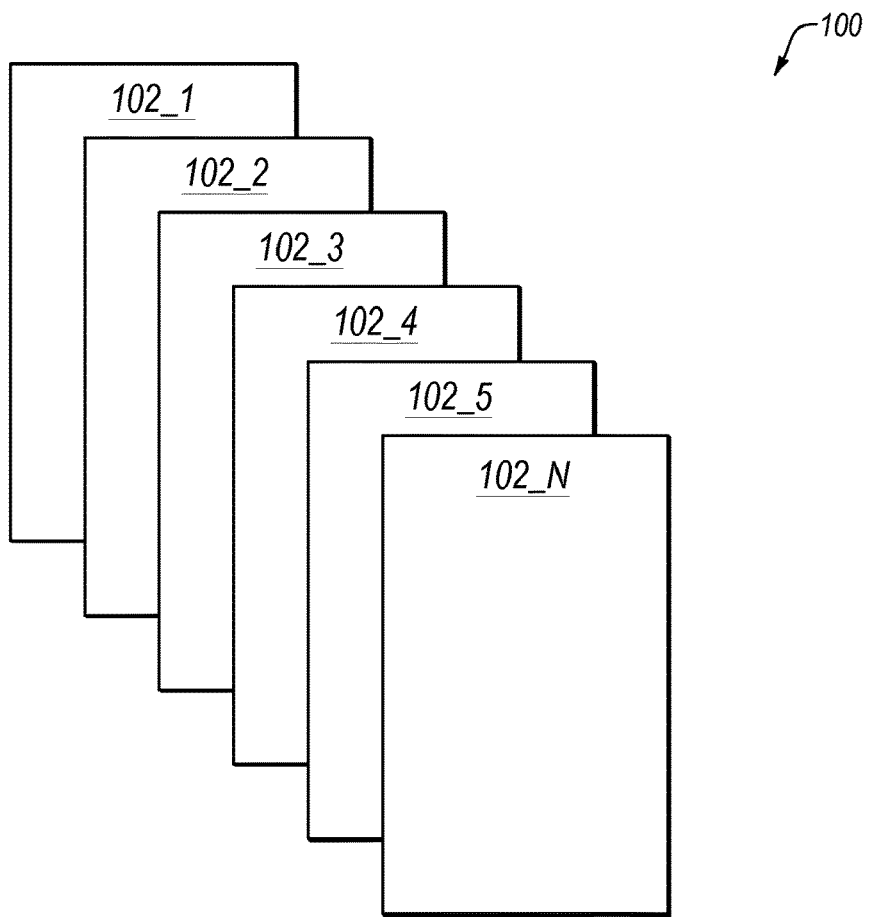
FIG. 1A depicts a state model including multiple stack traces.

Application whitelisting, which aims to ensure that only specifically selected programs and software libraries may be loaded, is intended to protect against unauthorized and malicious programs executing on a computer. While application whitelisting may provide protection around the time when an application is loaded, protection is not provided after the loading phase (e.g., during execution of the application). Thus, an application that has already been loaded into memory, and possible running, may become infected by a virus or malware, and thus, simply checking the contents of an application at its initial runtime may be insufficient to protect a system and its resources.

Various embodiments disclosed herein relate to stack trace whitelisting, which is different from application whitelisting. Stack trace whitelisting may provide for protection after the loading phase, unlike application whitelisting. In some embodiments, upon detection of a non-whitelisted stack trace, at least one remedial action may be performed. For example, upon detection of a non-whitelisted stack trace, an alert for providing notification of an unexpected, abnormal and/or inconsistent event (e.g., caused by malware), may be generated. The alert may be any suitable alert, such as a visual notification (e.g., via a display), an email (e.g., sent to a user and/or an administrator), and/or a text message (e.g., sent to a user and/or an administrator). In one embodiment, the alert may include a request for permission to continue with execution of the application. Further, is some embodiments, upon detection of a non-whitelisted stack trace, a running application may be stopped (e.g., terminated or halted) and/or one or more operations of the running application (e.g., a specific function call) may be blocked.

According to at least one embodiment, a system may include one or more processors and one or more non-transitory computer-readable media coupled to the one or more processors. The one or more non-transitory computer-readable media may include instructions that, when executed by the one or more processors, are configured to cause the one or more processors to perform operations. The operations may include generating a state model for an application including a plurality of modeled stack traces generated via execution of a plurality of characterization scenarios of the application. The operations may further include comparing each static data point in at least one stack trace generated during execution of the application to one or more modeled stack traces of the plurality of modeled stack traces of the state model. The operations may further include detecting, based on the comparison, at least one inconsistent event in the at least one stack trace generated during executing of the application. The at least one inconsistent event may include at least one event selected from a list of events including an inconsistent function, an inconsistent parameter, and an inconsistent function call. In addition, the operations may also include performing at least one remedial action in response to detection of the at least one inconsistent event.

According to these and other embodiments, the present disclosure includes methods for detecting unexpected events during execution of an application. Various embodiments of such a method may include generating a state model for an application including a plurality of expected stack traces generated via execution of a plurality of characterization scenarios of the application. The method may also include comparing each static data point in at least one stack trace generated during execution of the application to one or more expected stack traces of the plurality of expected stack traces of the state model to detect at least one unexpected event. Further, the method may include performing at least one remedial action in response to detection of the at least one inconsistent event.

Yet other embodiments of the present disclosure include computer-readable media storage storing instructions that in response to being executed by a processor cause the processor to perform instructions in accordance with one or more embodiments described herein.

Other aspects, as well as features and advantages of various aspects, will become apparent to those of skill in the art though consideration of the ensuing description, the accompanying drawings and the appended claims.

Many programming languages (e.g., C, C++, Java and others), include functions, which may call one or more other functions. A function call may include one or more parameters. A "stack" is a mechanism to track function calls, and in some architectures, passed parameters (e.g., identify a chain of functions that were called and in some CPUs also parameters that were passed and/or local variables used). Stated another way, a stack may include information associated with a history of function calls, and the information may be used to determine where execution should return upon completion of a function (e.g., if function A calls function B, after completion of function B, execution may return to function A).

According to one embodiment, a state model (also referred to as a "state machine") of an application may be generated. More specifically, an application may be "run" or "executed" in one or more characterization scenarios (e.g., all possible execution scenarios), to generate one or more expected stack traces (e.g., all possible expected stack traces). It is noted that a "characterization scenario" may also be referred to herein as a "test scenario." Further, during operation of each characterization scenario, a stack trace may be captured (e.g., a snapshot of a stack trace during execution of each characterization scenario may be captured).

A state model of the application, which may include multiple modeled (expected) stack traces for the application, may be generated via execution of the one or more characterization scenarios. Further, one or more stack traces generated during execution (i.e., non-characterization execution) of the application may compared against the state model. More specifically, for example, one or more functions, one or more local variables, and/or one or more parameters of a stack trace generated during execution of the application may be compared to the state model, which may include one or more functions, one or more variables, and possibly one or more parameters called by the one or more functions. Moreover, based on the comparison, one or more unexpected (non-congruent) events during execution of the application may be identified via identifying one or more unexpected stack traces. If the execution (i.e., non-characterization execution) of the application does not match (e.g., is not congruent with) the previously generated state model for the application, it may be determined that an unexpected (non-congruent) event has occurred or is occurring (e.g., malware may be present). An unexpected event may be caused by malware (e.g., the application is being exploited) and/or or the application may include a bug or an error. In the event an unexpected event (e.g., an unexpected function, an unexpected parameter, and/or an unexpected function call) is occurring or has occurred, at least one remedial action may be performed (e.g., an alert may be triggered (e.g., for notification and/or requesting permission to continue), execution may be halted, etc.).

It is noted that in some cases, different flows (paths) may arrive at the same function. Thus, a stack trace for a function may need to be compared against multiple stack traces that may cause execution to arrive at the function. Further, if access to source code is available, a stack trace for a function may be compared against source code to check relevant stack traces.

As noted above, a snapshot (also referred to herein as a "smart representation") of a stack trace may be used to detect an inconsistent event. A "snapshot" of a stack trace may include at least a portion of the content of the stack trace. Capturing and comparing the entire content of a stack trace may generate false positives because dynamic data points (e.g., the location of the stack and the memory address of libraries are being loaded) may change between execution of applications. Utilizing a snapshot may aide to distinguish between data points which are static (e.g., a name of a function, total number of parameters passed to the function, etc.) and dynamic, which may change (e.g., address pointers, source port numbers, etc.). In some embodiments, a snapshot may include static data points. Further, a snapshot may include dynamic data points, which may be generalized so as to prevent false positives upon comparing a snapshot to a stack generated during execution of an application. For example, dynamic data points may be represented in a snapshot via a symbol that generalizes the data (e.g., as a specific number that is not saved). According to one embodiment, static and dynamic data points may be identified via matching data points across multiple executed characterization scenarios.

Some CPUs (e.g., x86) may store, on a stack, one or more parameters passed to a function, and variables local to a function. Further, a CPU may or may not use the stack for passing parameters and/or local variables. In an embodiment wherein a CPU uses only registers to pass parameters/local variables for functions, register data may be saved as part of a snapshot, wherein static and dynamic data points are distinguished, as described above. Further, local variables used by a function may be included as part of a state model.

An application may run in a cluster (i.e., run in parallel on more than one device). Therefore, in some embodiments, stack traces generated via applications running in parallel (i.e., in a cluster) may be compared (e.g., in real-time) to detect one or more unexpected events.

FIG. 1A depicts a state model 100 of an application including N stack traces 102 (i.e., 102_1-102_N). Each stack trace 102, which may include a snapshot of a stack trace, may correspond to an executed characterization scenario for the application and may identify, for example, function calls and passed parameters during execution of the characterization scenario.

Figure 1B:
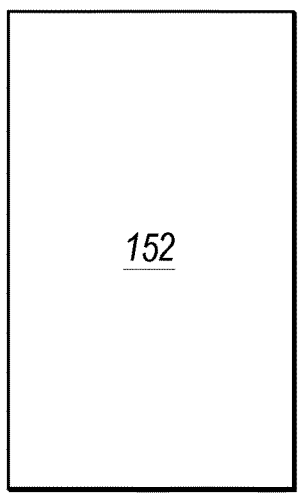
FIG. 1B depicts a stack trace.
Figure 1C:
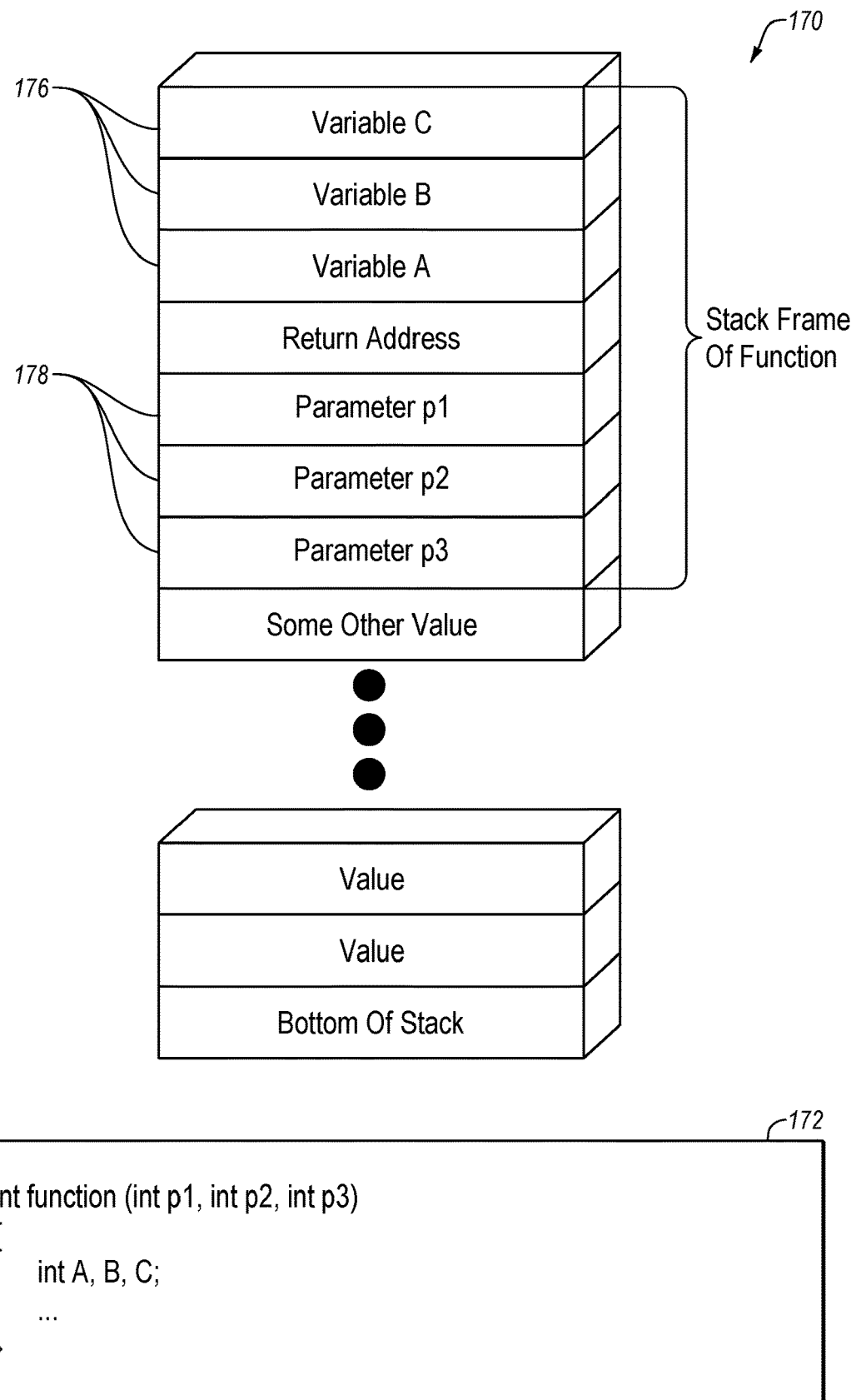
FIG. 1C illustrates an example stack trace layout.

FIG. 1B depicts a stack trace 152 generated during execution (i.e., non-characterization execution) of the application. Upon generation, stack trace 152 may be compared to state model 100 (see FIG. 1A), and more specifically to a related stack trace 102 of state model 100. FIG. 1C illustrates an example stack trace layout 170 and corresponding source code 172 of a function 174 including variables 176 and parameters 178.

In the event stack trace 152 does not match at least one stack trace 102 of state model 100, it may be determined that an unexpected stack trace has been generated and thus, an unexpected/inconsistent event has occurred or is occurring. An "unexpected event" or "inconsistent event" may include an event that is not or was not intended by a designer or a developer of an application, and may be due to, for example, malware, a bug, an error, or any combination thereof. For example, an "unexpected event" or "inconsistent event" may include a change of one or more static data points, as described above.

More specifically, if stack trace 152 includes, for example, an unexpected or inconsistent function, an unexpected or inconsistent parameter, an unexpected or inconsistent variable, an unexpected or inconsistent order of functions, an unexpected or inconsistent function call, or any combination thereof, it may be determined that stack trace 152 does not match at least one stack trace 102 and, therefore, it may be determined that an unexpected event or an inconsistent event has occurred or is occurring. Yet as a more specific example, stack trace 152 may indicate that a function X has called a function Y, and passed parameters A and B to function Y. However, state model 100 may indicate that although function X may call function Y, function X should pass only parameter A to function Y. In this example, an unexpected or an inconsistent parameter may be detected and, thus, it may be determined that an unexpected or an inconsistent event has occurred or is occurring. As another example, stack trace 152 may indicate that a function D has called a function E. However, state model 100 may indicate that function D is not programmed to call function E. In this example, an unexpected function call or an inconsistent function call may be detected and, thus, it may be determined that an unexpected event or an inconsistent event has occurred or is occurring. In another example, stack trace 152 may indicate that a function M has called a function N, which, upon completion, calls a function P. However, state model 100 may indicate that although function M may call function N, upon completion of function N, execution should return to function M. In this example, an unexpected function call or an inconsistent function call may be detected and, thus, it may be determined that an unexpected event or an inconsistent function call has occurred or is occurring. In yet another example, stack trace 152 may indicate that a variable local to function M has been modified and, therefore, it may be determined that an unexpected or inconsistent event has occurred or is occurring.

As noted above, an application may become infected with a virus and/or malware during execution (i.e., non-characterization execution) of the application. Further, bugs and/or errors may be found during execution (i.e., non-characterization execution) of the application. Due to stack trace 152, which may comprise a snapshot of a stack trace, being captured during execution (i.e., non-characterization execution) of an application, various embodiments disclosed herein provide for dynamic analysis of an application. Stated another way, in contrast to static analysis, which only provides protection at load time, various embodiments disclosed herein may detect, and possibly protect against, unauthorized and malicious programs during execution of the application.

The term "0-day" is used to refer to a vulnerability, which has been discovered (e.g., by a user) but has not been reported to the community and/or the vendor of the vulnerable application. Because it is not reported, a patch for the vulnerability may not be available and, as a result, 0-day vulnerabilities are a major threat in the security industry. Due to the dynamic detection of unauthorized and/or malicious programs, as provided by various embodiments disclosed herein, 0-day vulnerabilities may be more easily detected.

Figure 2:
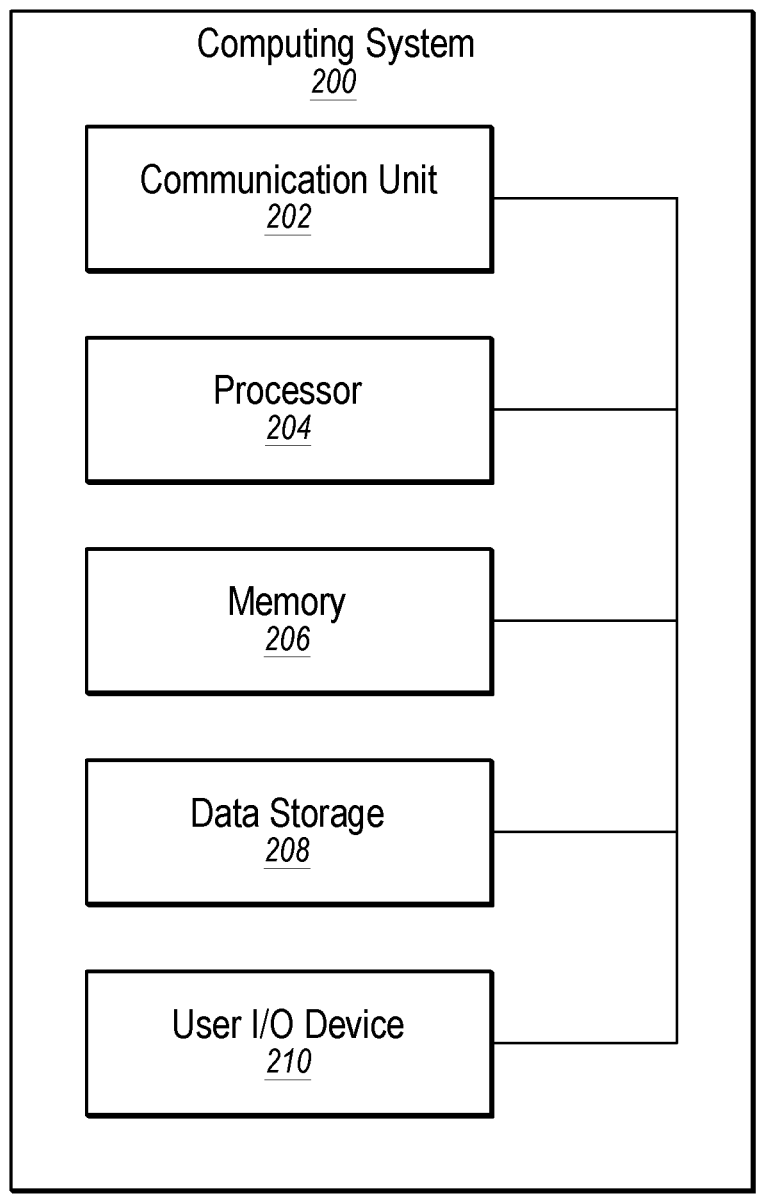
FIG. 2 illustrates an example computing system in which some embodiments may be implemented.

FIG. 2 illustrates an example computing system 200. Computing system 200 may include a communication unit 202, one or more processors 204, a memory 206, user input/output (I/O) device 210, and a data storage 208. Some examples of computing system 200 may include a desktop computer, a laptop computer, a server computer, a tablet computer, a mobile phone, a smartphone, a personal digital assistant (PDA), a network device, a server, or other suitable device, or combination thereof.

Processor 204 may include any suitable special-purpose or general-purpose computer, computing entity, or processing device including various computer hardware or software modules and may be configured to execute instructions stored on any applicable computer-readable storage media. For example, processor 204 may include a microprocessor, a microcontroller, a digital signal processor (DSP), an ASIC, an FPGA, or any other digital or analog circuitry configured to interpret and/or to execute program instructions and/or to process data. Although illustrated as a single processor in FIG. 2, it is understood that processor 204 may include any number of processors configured to perform individually or collectively any number of operations described herein. Additionally, one or more of the processors may be present on one or more different electronic devices. In some embodiments, processor 204 may interpret and/or execute program instructions and/or process data stored in memory 206, data storage 208, or memory 206 and data storage 208. In some embodiments, processor 204 may fetch program instructions from data storage 208 and load the program instructions in memory 206. After the program instructions are loaded into memory 206, processor 204 may execute the program instructions.

Memory 206 and data storage 208 may include computer-readable storage media for carrying or having computer-executable instructions or data structures stored thereon. Such computer-readable storage media may include any available media that may be accessed by a general-purpose or special-purpose computer, such as the processor 204. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause processor 204 to perform a certain operation or group of operations. According to one embodiment, memory 206 and/or data storage 208 may include one or more applications, which may be monitored in accordance with various embodiments of the present disclosure.

Communication unit 202 may include hardware configured to receive and send communications. In some embodiments, communication unit 202 may include an antenna, a wired port, and/or modulation/demodulation hardware, among other communication hardware devices. In particular, communication unit 202 may be configured to receive a communication (e.g., from a remote device) and present the communication to processor 104 for classifying or to send a communication from processor 204 to another device or network.

I/O device 210 may include hardware configured to notify a user of computing system 200 of a communication, present a communication to a user, or to notify a user of a communication and present the communication to the user. In some embodiments, I/O device 210 may include a speaker, a microphone, a display, a keyboard, and/or a touch screen, among other hardware devices. In these and other embodiments, I/O device 210 may also be configured to receive input from a user of computing system 200.

In view of this disclosure, it will be appreciated that modifications, additions, or omissions may be made to computing system 200 without departing from the scope of the present disclosure. For example, in some embodiments, computing system 200 may not include I/O device 210. In these and other embodiments, computing system 200 may be a server or other computing device or system that monitors for occurrence of monitored events using communication unit 202. In some embodiments, the different components of device 200 may be physically separate and may be communicatively coupled via any suitable mechanism. For example, data storage 208 may be part of a storage device that is separate from a server, which includes processor 204, memory 206, and the communication interface, that is communicatively coupled to the storage device.

It is noted that computing system 200 may be used for carrying out one or more embodiments of the present disclosure. For example only, computing system 200 may be configured to generate a state model of an application via executing one or more characterization scenarios and capturing a stack trace for each executed characterization scenario. Further, device 200 may be configured to detect an unexpected execution event based on a comparison of the state model to one or more stack traces generated during execution of the application. Thus, compared to application whitelisting, which only provides protection when an application is loaded, embodiments of the present disclosure provide for dynamic analysis of an application, thus, allowing for detection of unexpected events (e.g., caused by malware) during execution of the application.

Figure 3:
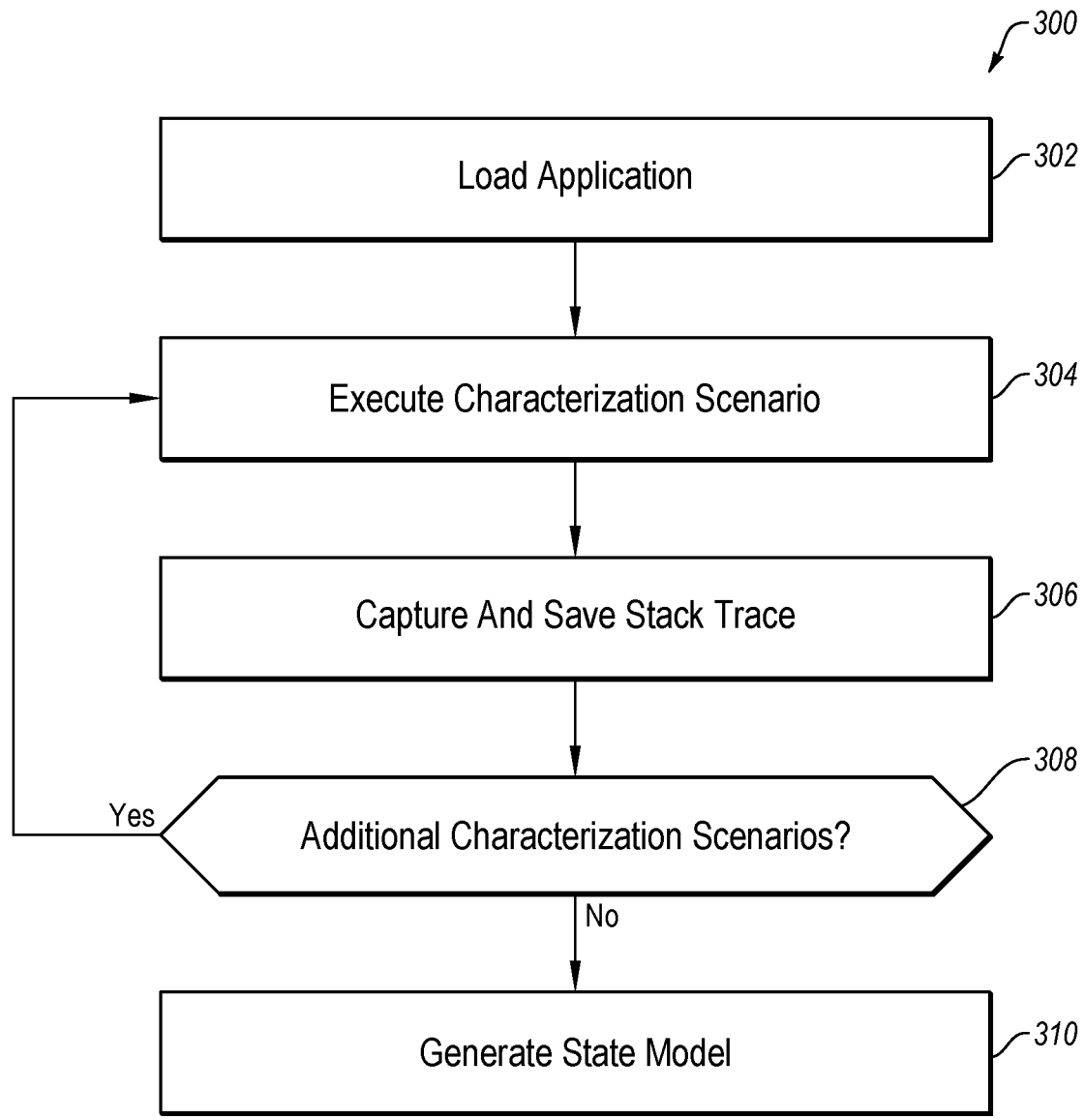
FIG. 3 is a flowchart depicting an example method of generating a state model for an application.

FIG. 3 is a flowchart illustrating an example method 300 of generating a state model for an application. Method 300 may be arranged in accordance with at least one embodiment described herein. Method 300 may be implemented, in some embodiments, by a system or device, such as computing system 200 of FIG. 2. Although illustrated as discrete blocks, various blocks of method 300 may be divided into additional blocks, combined into fewer blocks, or eliminated, depending on the desired implementation.

At block 302, an application may be loaded (e.g., by a computing system, such as computing system 200 of FIG. 2), and method 300 may proceed to block 304.

At block 304, a characterization scenario for the application may be executed, and method 300 may proceed to block 306. For example, a characterization scenario may include execution of one or more functions of the application, one or more function calls of the application, or any other tasks performed by the application.

At block 306, a stack trace generated in response to the executed characterization scenario may be captured and saved (e.g., in memory 206 or data storage 208 of FIG. 2). In some examples block 304 and/or 306 may be repeated to capture slight differences that may occur when executing a characterization scenario. Method 300 may proceed to block 308.

At block 308, a determination may be made as to whether additional unexecuted characterization scenarios exist. In response to additional unexecuted characterization scenarios existing, method 300 may return to block 304 to execute and capture stack traces associated with the new characterization. In response to no unexecuted characterization scenarios existing, method 300 may proceed to block 310.

At block 310 a state model based on one or more captured stack traces may be generated.

Modifications, additions, or omissions may be made to method 300 without departing from the scope of the present disclosure. For example, the operations of method 300 may be implemented in differing order. Furthermore, the outlined operations and actions are only provided as examples, and some of the operations and actions may be optional, combined into fewer operations and actions, or expanded into additional operations and actions without detracting from the essence of the disclosed embodiments.

Figure 4:
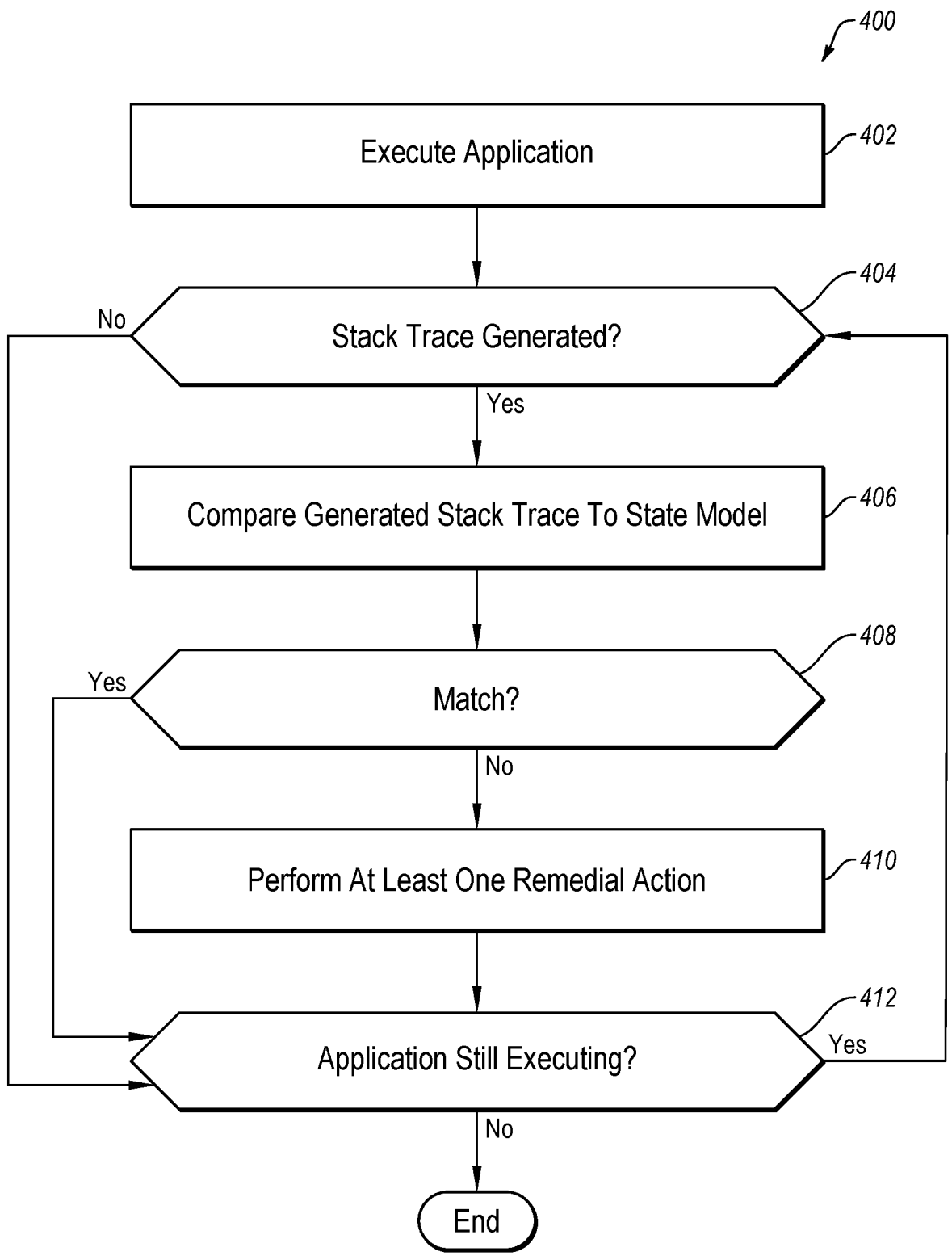
FIG. 4 is a flowchart depicting an example method of detecting an unexpected event during execution of an application.

FIG. 4 is a flowchart illustrating an example method 400 of detecting one or more unexpected events during execution of an application. Method 400 may be arranged in accordance with at least one embodiment described herein. Method 400 may be implemented, in some embodiments, by a system or device, such as computing system 200 of FIG. 2. Although illustrated as discrete blocks, various blocks of method 400 may be divided into additional blocks, combined into fewer blocks, or eliminated, depending on the desired implementation.

At block 402, an application may be executed and/or the execution of the application may be detected and method 400 may proceed to block 404.

At block 404, a determination may be made as to whether a stack trace for the application has been generated. If a stack trace has not been generated, method 400 may proceed to block 412. If a stack trace has been generated, method 400 may proceed to block 406.

At block 406, the generated stack trace may be compared to one or more associated state models (e.g., the state model generated at block 310 in method 300; see FIG. 3), and method 400 may proceed to block 408.

At block 408, a determination may be made as to whether the generated stack trace matches one or more of the associated state models. In response to the generated stack trace matching at least one of the associated state models, method 400 may proceed to block 412. In response to the generated stack trace not matching the associated state model, method 400 may proceed to block 410.

At block 410, at least one remedial action may be performed. For example, a remedial action may include an alert that identifies an unexpected event. Furthermore, additional remedial actions, such as halting operation of the application, providing the alert to a user and/or administrator regarding the potential bug and/or malware, requesting permission from the user and/or the administrator to continue running the application, and/or the like, may be performed. Method 400 may also proceed to block 412.

At block 412, a determination may be made as to whether the application is still executing. If the application is still executing, method 400 may return to block 404. If the application is no longer executing, method 400 may end.

Modifications, additions, or omissions may be made to method 400 without departing from the scope of the present disclosure. For example, the operations of method 400 may be implemented in differing order. Furthermore, the outlined operations and actions are only provided as examples, and some of the operations and actions may be optional, combined into fewer operations and actions, or expanded into additional operations and actions without detracting from the essence of the disclosed embodiments.

Figure 5:
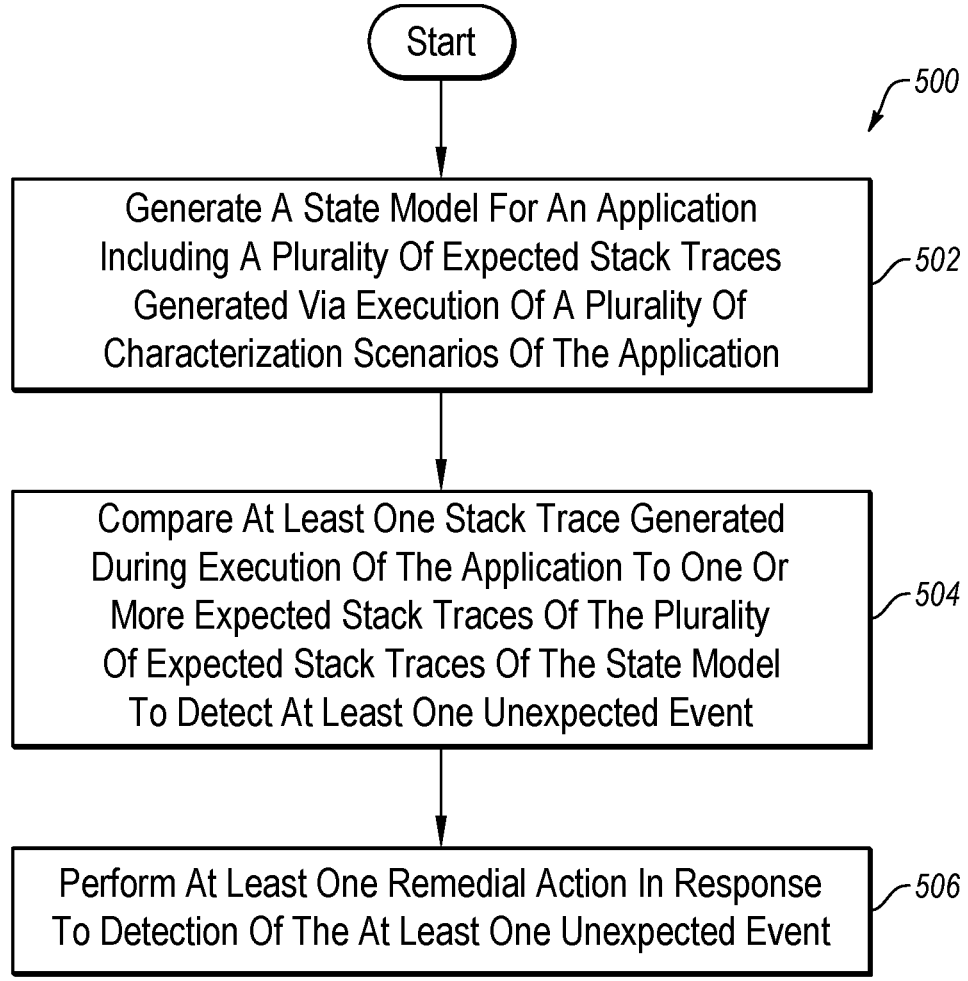
FIG. 5 is a flowchart depicting another example method of detecting an unexpected event during execution of an application.

FIG. 5 is a flowchart illustrating an example method 500 of detecting one or more unexpected events during execution of an application. Method 500 may be arranged in accordance with at least one embodiment described herein. Method 500 may be implemented, in some embodiments, by a system or device, such as computing system 200 of FIG. 2. Although illustrated as discrete blocks, various blocks of method 500 may be divided into additional blocks, combined into fewer blocks, or eliminated, depending on the desired implementation.

At block 502, a state model for an application may be generated, and method 500 may proceed to block 504. For example, the state model may be generated based on multiple of stack traces generated via execution of a multiple characterization scenarios. More specifically, for example, state model 100, which includes one or more stack traces 102, (see FIG. 1A) may be generated, wherein each stack trace 102 of state model 100 is generated from an executed characterization scenario.

At block 504, one or more stack traces generated during execution of the application may be compared to the state model to detect at least one unexpected event, and method 500 may proceed to block 506. For example, at least one function and/or at least one parameter in stack trace 152 (See FIG. 1B) may be compared to one or more expected stack traces of state model 100 (see FIG. 1A), and in the event stack trace 152 does not match a stack trace 102 of state model 100, it may be determined that an unexpected event has occurred or is occurring.

At block 506, at least one remedial action may be performed in response to detection of the at least one unexpected event. For example, a remedial action may include halting or terminating a running application, blocking one or more operations (e.g., a specific function call) of a running application, generating an alert, or any combination thereof.

Modifications, additions, or omissions may be made to method 500 without departing from the scope of the present disclosure. For example, the operations of method 500 may be implemented in differing order. Furthermore, the outlined operations and actions are only provided as examples, and some of the operations and actions may be optional, combined into fewer operations and actions, or expanded into additional operations and actions without detracting from the essence of the disclosed embodiments.

As noted above, various embodiments of the present disclosure provide for dynamic analysis of an application, which may be executed on an electronic device (e.g., a server). Thus, various embodiment may aide in detection of unexpected events (e.g., caused by malware) during execution of the application and, therefore may limit, and possibly prevent, an attack on the device. Accordingly, various embodiments may improve the way a device (e.g., a computer, server, etc.) operates and/or may improve computer-related technologies, such as intrusion detection technologies. In addition, various embodiments may improve technological fields of, for example only, computer security, cybersecurity, and/or information technology (IT) security. Thus, various embodiments may provide greater uptime and reliability, and may limit, and possibly prevent wastage of processing and/or networking resources.

As indicated above, the embodiments described herein may include the use of a special purpose or general purpose computer (e.g., processor 204 of FIG. 2) including various computer hardware or software modules, as discussed in greater detail below. Further, as indicated above, embodiments described herein may be implemented using computer-readable media (e.g., memory 206 of FIG. 2) for having computer-executable instructions or data structures stored thereon.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc. are not necessarily used herein to connote a specific order. Generally, the terms "first," "second," "third," etc., are used to distinguish between different elements. Absence a showing of a specific that the terms "first," "second," "third," etc. connote a specific order, these terms should not be understood to connote a specific order.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that various changes, substitutions, and alterations could be made hereto without departing from the spirit and scope of the present disclosure.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A system, comprising:
   one or more processors; and
   one or more non-transitory computer-readable media communicatively coupled to the one or more processors and including instructions that, in response to being executed by the one or more processors, are configured to cause the system to perform operations, the operations comprising:
   obtaining, during a test phase of a software application, a snapshot of a first stack trace of the software application with respect to execution of a characterization scenario of the software application, the first stack trace indicating a first sequence of function calls performed by the software application during execution of the characterization scenario;
   obtaining, during a use phase of the software application, a second stack trace of the software application with respect to a runtime execution of the software application, the second stack trace indicating a second sequence of function calls performed by the software application during the runtime execution of the software application;
   determining that an unexpected event occurred during the runtime execution in response to a determination that first behavior of the software application indicated by the snapshot of the first stack trace is inconsistent with second behavior of the software application indicated by the second stack trace; and
   performing a remedial action in response to determining that the unexpected event occurred during the runtime execution.

2. The system of claim 1, wherein the determination that the first behavior is inconsistent with the second behavior includes determining that the first sequence of function calls of the snapshot of the first stack trace and the second sequence of function calls of the second stack trace are incongruent with each other in that a particular sequence of function calls predicted by the snapshot of the first stack trace in response to one or more particular parameters being present is not followed by the second stack trace in response to the presence of the one or more particular parameters during the runtime execution.

3. The system of claim 1, wherein the determination that the first behavior is inconsistent with the second behavior is based on a comparison of a first order of function calls of the first sequence of function calls against a second order of function calls of the second sequence of function calls.

4. The system of claim 1, wherein the determination that the first behavior is inconsistent with the second behavior is based on a comparison of first functions included in the first sequence of function calls against second functions included in the second sequence of function calls.

5. The system of claim 1, wherein the determination that the first behavior is inconsistent with the second behavior is based on a comparison of first parameters passed in the first sequence of function calls against second parameters passed in the second sequence of function calls.

6. The system of claim 1, wherein the operations further comprise selecting the first stack trace for comparison against the second stack trace for determining that the unexpected event occurred during the runtime execution in response to a determination that the first stack trace is relevant to the second stack trace, the determination that the first stack trace is relevant to the second stack trace being based on a comparison of the second stack trace against source code of the software application.

7. The system of claim 1, wherein the operations further comprise:
   identifying first dynamic data points of the snapshot of the first stack trace;
   identifying first static data points of the snapshot of the first stack trace;
   identifying second dynamic data points of the second stack trace; and
   identifying second static data points of the second stack trace, wherein the determination that the first behavior is inconsistent with the second behavior is based on a comparison of the first static data points against the second static data points while ignoring the first dynamic data points and the second dynamic data points.

8. One or more non-transitory computer-readable media communicatively coupled to one or more processors and including instructions that, in response to being executed by the one or more processors, are configured to cause a system to perform operations, the operations comprising:

obtaining, during a test phase of a software application, snapshots of a plurality of first stack traces of the software application, each first stack trace being with respect to execution of a respective characterization scenario of the software application in which each first stack trace indicates a corresponding first sequence of function calls performed by the software application during execution of the respective characterization scenario;

obtaining, during a use phase of the software application, a second stack trace of the software application with respect to a runtime execution of the software application, the second stack trace indicating a second sequence of function calls performed by the software application during the runtime execution of the software application;

determining that an unexpected event occurred during the runtime execution in response to a determination, based on a comparison of each of the snapshots of the first stack traces against the second stack trace, that first behavior of the software application indicated by the snapshots of the plurality of first stack traces is inconsistent with second behavior of the software application indicated by the second stack trace; and performing a remedial action in response to determining that the unexpected event occurred during the runtime execution.

9. The one or more computer-readable media of claim 8, wherein:
each first sequence of function calls arrives at a particular function;
the second sequence of function calls arrives at the particular function; and
the comparison of each of the snapshots of the first stack traces against the second stack trace is in response to each of the first sequences of function calls and the second sequence of function calls arriving at the particular function.

10. The one or more computer-readable media of claim 8, wherein determining that the unexpected event occurred is in response to each of the first sequences of function calls of the first stack traces being incongruent with the second sequence of function calls of the second stack trace.

11. The one or more computer-readable media of claim 8, wherein the comparison includes comparing a first respective order of function calls of each first sequence of function calls against a second order of function calls of the second sequence of function calls.

12. The one or more computer-readable media of claim 8, wherein the comparison includes comparing first functions included in each first sequence of function calls against second functions included in the second sequence of function calls.

13. The one or more computer-readable media of claim 8, wherein the comparison includes comparing first parameters passed in each first sequence of function calls against second parameters passed in the second sequence of function calls.

14. The one or more computer-readable media of claim 8, wherein the operations further comprise:

identifying first static data points of the snapshots of the first stack traces; and
identifying second static data points of the second stack trace, wherein the comparison includes comparing the first static data points against the second static data points.

15. A method, comprising:
capturing, as a first captured stack trace, a snapshot of a first stack trace of a software application during execution of a characterization scenario of the software application, the first captured stack trace including a first sequence of function calls performed by the software application during execution of the characterization scenario, wherein the first captured stack trace is captured during a test execution of the software application;

capturing, as a second captured stack trace, a snapshot of a second stack trace of the software application during a runtime execution of the software application, the second captured stack trace including a second sequence of function calls performed by the software application during the runtime execution of the software application;

determining that an unexpected event occurred during the runtime execution in response to a determination that first behavior of the software application indicated by the first captured stack trace is inconsistent with second behavior of the software application indicated by the second captured stack trace; and performing a remedial action in response to determining that the unexpected event occurred during the runtime execution.

16. The method of claim 15, wherein the determination that the first behavior is inconsistent with the second behavior includes determining that the first sequence of function calls of the first captured stack trace and the second sequence of function calls of the second captured stack trace are incongruent with each other.

17. The method of claim 15, wherein the determination that the first behavior is inconsistent with the second behavior is based on a comparison of a first order of function calls of the first sequence of function calls against a second order of function calls of the second sequence of function calls.

18. The method of claim 15, wherein the determination that the first behavior is inconsistent with the second behavior is based on a comparison of first functions included in the first sequence of function calls against second functions included in the second sequence of function calls.

19. The method of claim 15, wherein the determination that the first behavior is inconsistent with the second behavior is based on a comparison of first parameters passed in the first sequence of function calls against second parameters passed in the second sequence of function calls.

20. The method of claim 15, further comprising:
identifying first static data points of the first stack trace; and
identifying second static data points of the second stack trace, wherein the determination that the first behavior is inconsistent with the second behavior is based on a comparison of the first static data points against the second static data points.

* * * * *